United States Patent
Byun et al.

(10) Patent No.: US 6,606,524 B1
(45) Date of Patent: Aug. 12, 2003

(54) SYSTEM AND METHOD FOR CONTROLLING AN IN-LINE APPARATUS

(75) Inventors: Sung-Joon Byun, Choongcheongnam-do (KR); Jong-Beom An, Choongcheongnam-do (KR); Min-Young Heo, Choongcheongnam-do (KR); Hyung-Jin Yun, Choongcheongnam-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/503,157

(22) Filed: Feb. 11, 2000

(30) Foreign Application Priority Data

Feb. 12, 1999 (KR) ............................................. 99-4980

(51) Int. Cl.$^7$ ............................................. G05B 11/01
(52) U.S. Cl. ............................ 700/19; 700/20; 700/121
(58) Field of Search ........................ 700/19–20, 1, 700/121; 414/935

(56) References Cited

U.S. PATENT DOCUMENTS 5,428,470 A * 6/1995 Labriola, II ................. 359/119
5,914,880 A * 6/1999 Yasojima et al. ............ 700/159
6,000,830 A * 12/1999 Asano et al. ................ 700/121
6,113,735 A * 9/2000 Chu et al. .............. 156/345.28
6,169,928 B1 * 1/2001 Olson et al. ..................... 700/7
6,269,279 B1 * 7/2001 Todate et al. ............... 700/121

* cited by examiner

Primary Examiner—John Follansbee
Assistant Examiner—Ronald D Hartman, Jr.
(74) Attorney, Agent, or Firm—McGuireWoods LLP

(57) ABSTRACT

Disclosed is an in-line apparatus system that comprises a plurality of sub-apparatuses, a host, a plurality of apparatus controllers, and a master controller. The sub-apparatuses perform predetermined jobs on the substrates. The host stores information on the substrate to be processed in the sub-apparatuses and information on jobs performed by the sub-apparatuses. The apparatus controllers respectively control substrate jobs in the sub-apparatuses according to the information on the substrates and jobs, and are interconnected through a network and share information on the substrates. The master controller, connected to the apparatus controllers, controls the apparatus controllers and receives job information of the sub-apparatuses from the apparatus controllers and transmits the job information to the host. The in-line apparatus system and its control method enable overall easy control and increase reliability.

19 Claims, 6 Drawing Sheets

SYSTEM AND METHOD FOR CONTROLLING AN IN-LINE APPARATUS

BACKGROUND OF THE INVENTION (a) Field of the Invention

The present invention relates to a system and method for controlling an in-line apparatus. More specifically, the present invention relates to a system and method for controlling an in-line apparatus used for manufacturing microelectronic devices such as thin film transistor liquid crystal displays (TFT-LCDs).

(b) Description of the Related Art

FIG. 1 shows a schematic diagram of a complete conventional in-line apparatus used in manufacturing TFT-LCDs.

The conventional in-line apparatus comprises a plurality of sub-apparatuses (LOADER, AP1~AP5, and UNLOADER) and controllers (CTRL-L, CTRL-1~CTRL-5, and CTRL-U), the controllers controlling each of the sub-apparatuses. As shown in FIG. 1, the sub-apparatuses positioned sequentially (LOADER, AP1~AP5, and UNLOADER), which perform predetermined jobs for each substrate of a TFT-LCD, performs the jobs on the workpieces such as substrates, when they pass through the sub-apparatuses continuously.

In a single unit apparatus, since a controller controls only the single apparatus, overall control is easy. Also, communications between the single apparatus and devices that control the apparatus are relatively simple. Finally, the reliability of the transferred data for such communications is high.

However, in an in-line apparatus, the data exchange between the plurality of sub-apparatuses themselves, and also between the sub-apparatuses and the devices that control the sub-apparatuses is complicated. The reliability of such data exchange is also low. Further, since data are only transmitted in a direction from one apparatus to a subsequent apparatus, it is difficult to control the sub-apparatuses bi-directionally.

SUMMARY OF THE INVENTION

It is an object of the present invention to provide a system and method for controlling an in-line apparatus used for manufacturing microelectronic devices such as TFT-LCDs, in which information between sub-apparatuses is shared to allow easy overall control of the in-line apparatus, and in which the reliability of the in-line apparatus is improved.

In order to achieve the purpose of the present invention, an in-line apparatus system comprises a plurality of sub-apparatuses, each of which sequentially performs a predetermined job, a host storing information on a substrate to be processed in the sub-apparatuses and information on jobs to be performed by the sub-apparatuses, a plurality of apparatus controllers, each of which controls the jobs to be performed on the substrate by the sub-apparatuses according to the information on the substrate and the information on the jobs, and each apparatus controller sharing the information on the substrate through connections enabling data communications, and a master controller that is connected to the apparatus controllers to control the apparatus controllers. The master controller receives information on the jobs processed by the sub-apparatuses from the apparatus controllers and transmits the information to the host, and to a corresponding apparatus controller the information on the substrate and the information on the jobs received from the host. The master controller and the apparatus controllers are configured with programmable logic controllers.

The present invention, also discloses a method for controlling such an in-line apparatus system.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustrating the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
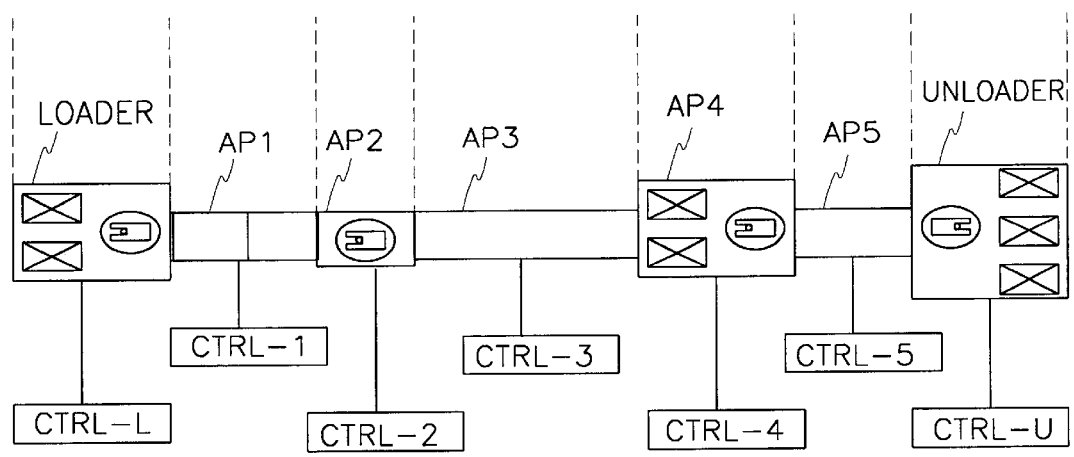
FIG. 1 is a schematic diagram of a complete conventional in-line apparatus.
Figure 2:
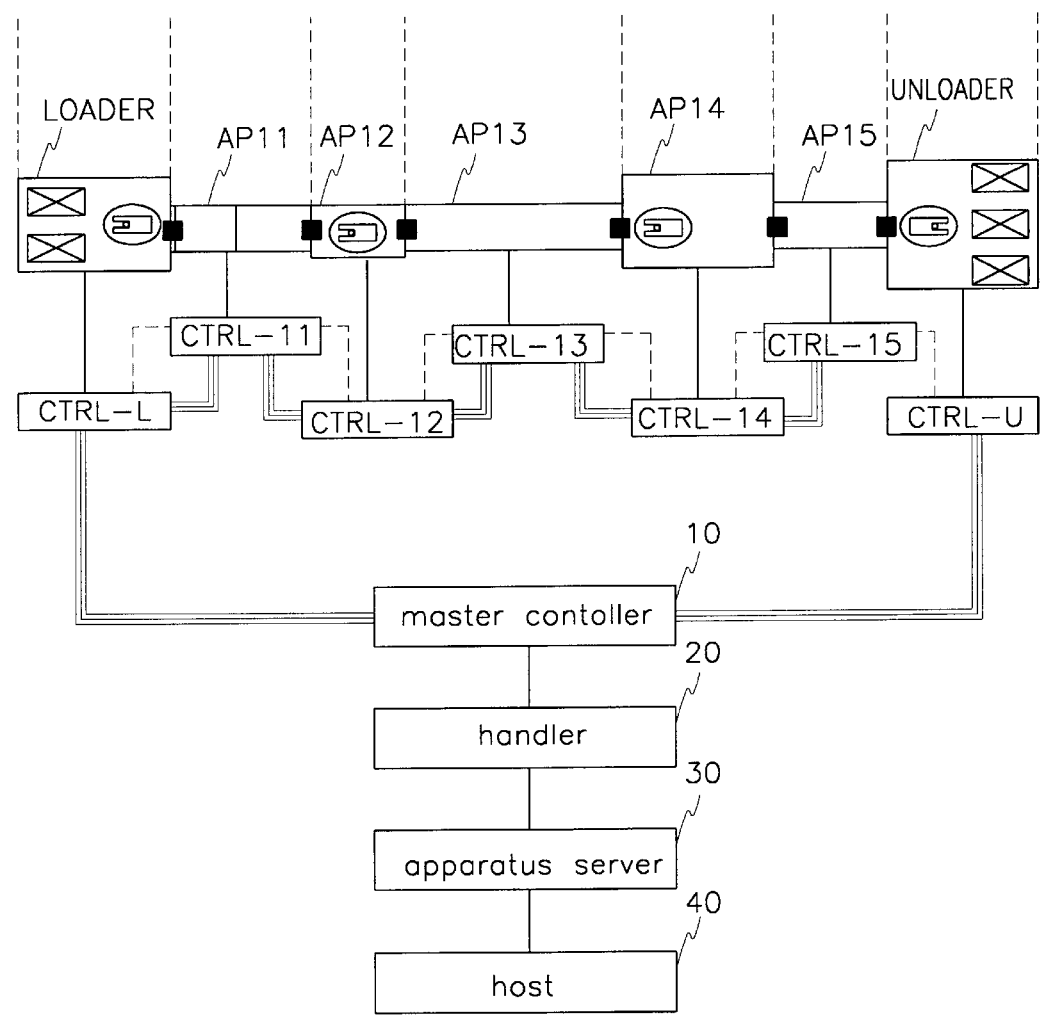
FIG. 2 is a schematic diagram of an in-line apparatus and a system for controlling the same according to a preferred embodiment of the present invention.

FIG. 2 is a schematic diagram of an in-line apparatus and a system for controlling the same according to a preferred embodiment of the present invention.

The in-line apparatus and system for controlling the same comprises a plurality of sub-apparatuses (LOADER, AP11, AP12, AP13, AP14, AP15, UNLOADER), a plurality of controllers (CTRL-L, CTRL-11, CTRL-12, CTRL-13, CTRL-14, CTRL-15, CTRL-U), a master controller 10, a handler 20, an apparatus server 30, and a host 40.

The sub-apparatuses (LOADER, AP11, AP12, AP13, AP14, AP15, UNLOADER), coupled in series, perform sequential jobs on substrates (i.e., workpieces go from one sub-apparatus to a subsequent sub-apparatus in a single direction). As shown in FIG. 2, the first sub-apparatus is the loader LOADER that loads and supplies the workpieces to the subsequent sub-apparatus; and the last sub-apparatus is the unloader UNLOADER that unloads the workpieces. After the workpieces are loaded on the loader, the workpieces are supplied to the sub-apparatuses AP11~AP15 where predetermined jobs are sequentially performed on the workpieces. The unloader then unloads the workpieces. As mentioned, the workpieces in the in-line apparatus are processed in one direction from the loader to the unloader.

The apparatus controllers (CTRL-L, CTRL-11, CTRL-12, CTRL-13, CTRL-14, CTRL-15, CTRL-U), each connected to the apparatus, control the jobs by the sub-apparatuses. Either parallel input/output (PIO) devices, serial IO devices, or serial/parallel IO devices can be placed between the apparatus controllers as shown by the dotted lines in FIG. 2. It is also possible for the apparatus controllers to be connected through cables or via means enabling wireless communications.

The master controller 10, connected to the first and the last apparatus controllers CTRL-L and CTRL-U through cables, controls the apparatus controllers. The handler 20, connected to the master controller 10 through an RS-232C cable and connected also to the apparatus server 30, converts information transmitted from the master controller 10 and the apparatus server 30 into formats suitable for use by the apparatus server 30 and the master controller 10, respectively. The host 40, connected to the apparatus server 30 through a local area network (LAN), stores information on the jobs and the workpieces processed in the apparatus.

When a workpiece such as a substrate is loaded on the apparatus, the sub-apparatuses transmit a message to the apparatus controllers that a new substrate has arrived. An ID of the substrate; a set ID of the substrates (referred to as a 'LOT' ID hereinafter); sub-apparatus status information; and a sub-apparatus ID are also transmitted to the apparatus controllers.

The apparatus controllers transmit the information transmitted from the sub-apparatuses to the master controller 10 through the cable, and the master controller 10 transmits the information transmitted from the apparatus controllers to the handler 20.

The master controller 10 allows the sharing of information between the apparatus controllers CTRL-L, CTRL-11~CTRL-15, and CTRL-U. The master controller 10 and the apparatus controllers can be connected via optical cables or via wireless communications. In either case, communications between the master controller 10 and the apparatus controllers is conducted through a link module. A method of communications between the link module, the master controller 10, and the apparatus controllers will be described hereinafter.

The master controller 10 and the apparatus controllers are configured with programmable logic controllers (PLC).

The handler 20 converts the information transmitted from the master controller 10 into a format that can be recognized by the apparatus server 30. That is, the master controller 10 processes information in binary data or ASCII code formats, while the apparatus server 30 processes information in a text data format. When the handler 20 uploads and downloads information, the handler 20 converts the information into a format appropriate for the master controller 10 and the apparatus server 30. Here, it is possible for the master controller 10 and the apparatus server 30 to handle information in different formats. The handler 20 and the master controller 10 are connected through an RS-232C cable. Here, it is possible for the handler 20 and the master controller 10 to be connected via wireless communications.

The apparatus server 30 receives job information of the apparatus from the handler 20 and transmits corresponding information to the host 40. The host 40 transmits stored job information to the apparatus server 30. The apparatus server 30 analyzes the job information stored in the host 40 and the job information of the apparatus transmitted from the handler 20, and determines whether or not a substrate waiting on the apparatus can be processed to determine whether or not to start the jobs on the substrate. The apparatus server 30 then transmits an instruction to the handler 20.

The handler 20 analyzes the information transmitted from the apparatus server 30, and converts the information into binary data or ASCII code format appropriate for the master controller 10 before transmitting the information to the master controller 10. When an instruction is transmitted to the master controller 10, since the master controller 10 and the apparatus controllers share information through the link module, the corresponding apparatus controller reads the instruction transmitted to the master controller 10, and transmits a job instruction to one of the sub-apparatuses according to the initial instruction transmitted to the master controller 10. The sub-apparatus performs its job according to the instruction, and reports results to the host 40.

A method in which the master controller 10 and the apparatus controllers share information and conduct communications will now be described.

The master controller 10 and the apparatus controllers transmit information using the link module. In the link module, a memory is shared, and the information to be transmitted is stored in the shared memory. Also, the address of the memory is transmitted to a device, and the device reads information from the memory of the address and transmits the information.

Figure 3:
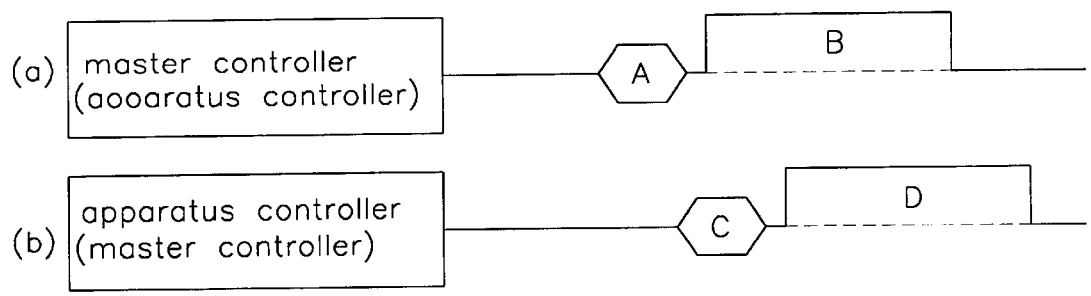
FIG. 3 shows a method of communications between a master controller and an apparatus controller according to a preferred embodiment of the present invention.

FIG. 3 shows a method of communications between the master controller 10 and the apparatus controllers. FIG. 3(a) shows an operation of the master controller 10 when an instruction is transmitted from the master controller 10 to the apparatus controllers, and FIG. 3(b) shows an operation of the apparatus controllers when an instruction is transmitted from the apparatus controllers to the master controller 10. Letters A and C of FIG. 3 represent information to be transmitted, and letters B and D represent relay flags which respectively indicate a transmission and receiving status of the master controller 10 and the apparatus controllers.

The operation of the master controller 10 when transmitting an instruction to one of the apparatus controllers will be described.

The master controller 10 and the apparatus controllers share a memory. The master controller 10 stores the instruction transmitted from the handler 20 in the memory of the master controller 10. Referring to FIG. 3(a), the master controller 10 turns on the relay flag B which has an address of the memory and the information A, and reports to one of the apparatus controllers. The apparatus controller reads the information C on the address of the memory transmitted from the master controller 10. Referring to FIG. 3(b), the apparatus controller turns on the relay flag D in order to inform that the apparatus has read the information stored in the memory. After the master controller 10 has received the relay flag ON signal from the apparatus controller, the master controller 10 turns off the relay flag and reports to the apparatus controller that the transmission of the information is finished. The apparatus controller receives the relay flag OFF signal from the master controller 10, and turns off the relay flag which indicates that the information receipt of the apparatus controller is finished.

In the above, the method of communications when information is transmitted from the master controller 10 to one of the apparatus controllers has been described. The method of communications when the information is transmitted from one of the apparatus controllers to the master controller 10 is performed in the same manner. This is made evident by the "apparatus controller" in parentheses in FIG. 3(a) and the "master controller" in parentheses in FIG. 3(b). Additionally, in order to prevent a malfunction in the communications between the master controller 10 and one of the apparatus controllers, a time out process is performed.

Figure 4:
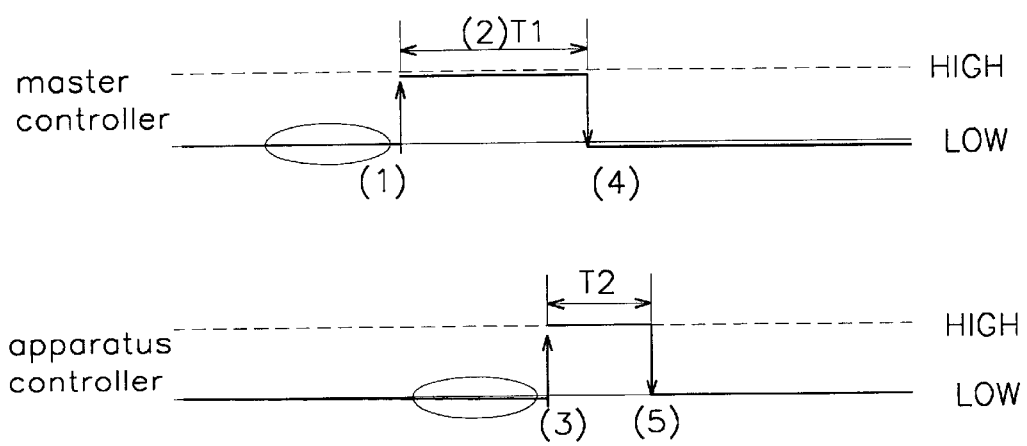
FIG. 4 shows a time out process between the master controller and the apparatus controller according to the preferred embodiment of the present invention.

FIG. 4 shows the time out process between the master controller and one of the apparatus controllers.

In case of transmission from the master controller 10 to the apparatus controller, the master controller 10 writes the information to the memory, transmits the information to the apparatus controller, then switches into a HIGH state (1). After the master controller 10 switches into a HIGH state, an interval T1 is checked (2). After receiving an instruction from the master controller 10, the apparatus controller transmits an acknowledge signal to the master controller 10 (3). The master controller 10 performs a time out operation in which it automatically turns off if the acknowledge signal is not provided within a predetermined time, or simply turns off if the acknowledge signal is provided to the master controller 10 within the predetermined time (4). The apparatus controller checks an interval of time T2 after the apparatus controller is turned on. The apparatus controller is turned off if an acknowledge signal is provided from the master controller 10 within a predetermined time, or performs a time out operation if the acknowledge signal is not provided from the master controller 10 within a predetermined time (5).

Through the time out process, it is possible to prevent a malfunction in which an acknowledge signal can not be received because either the master controller 10 or the apparatus controller is not properly working.

A job process in the apparatus will now be described.

When a job is finished in one of the sub-apparatuses according to the instructions, a job completion message is reported to the apparatus controller corresponding to the sub-apparatus. Then the apparatus controller transmits information of the job completion to the host 40. The apparatus server 30 receives the information of the job completion, compares the information with information stored in the host 40, and provides the sub-apparatus with an instruction to load a substrate to a next sub-apparatus. On receiving the instruction, the sub-apparatus transmits information on the substrate and job to the next sub-apparatus together with the substrate.

The apparatus controllers transmit information between the sub-apparatuses. The apparatus controllers transmit information through a link module and cables, and through a parallel input output device. The information transmitted by the link module includes information on the substrates such as substrate type; LOT IDs of the substrates; number of the substrates; cassette IDs on which a job is started; IDs of the substrates; grades of the substrates; and an ID of the sub-apparatus on which the jobs are started. The transmission method by the link module is the same as the method previously described.

The information transmitted by the parallel input output devices (PIO) includes information on the transmission and receiving of the left and right side sub-apparatuses; information on the start and end of a workpiece LOT; and information on the number of substrates in a cassette.

In place of the PIO, serial input output devices, or serial/parallel input output devices can also be used.

An information transmitting method of the PIO will be described.

Figure 5:
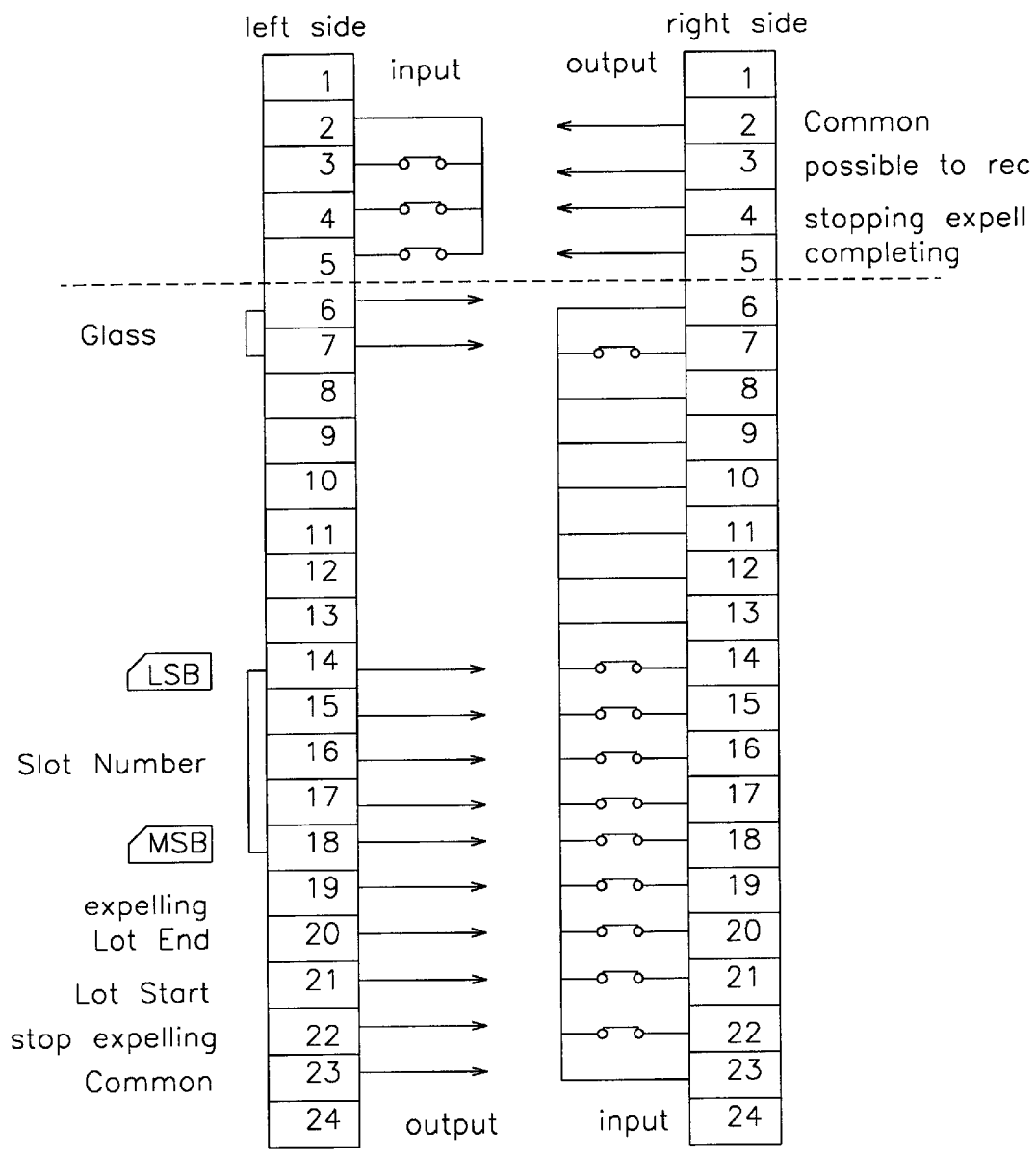
FIG. 5 is a schematic diagram of a parallel input and output device according to the preferred embodiment of the present invention.

FIG. 5 is a detailed schematic diagram of the PIO.

As shown, the PIO according to a preferred embodiment of the present invention is a connector which has 24 pins and physically interfaces left side sub-apparatuses and right side sub-apparatus. The pin numbers can be increased or decreased as needed.

Information, transmitted from the right side to the left side through the pins 2, 3, 4, and 5, includes a signal of whether a substrate, transmitted from the right side to the left side, can be received; a signal requesting to stop expelling a substrate; and a signal of whether the substrate has been received.

Information on the substrate type is transmitted from the left side to the right side through the pins 6 and 7. The number of substrates in a cassette is transmitted from the left side to the right side through the pins 14, 15, 16, 17 and 18. A signal to expel and to stop expelling a substrate, and information on the start and the end of-the substrate LOT are transmitted from the left side to the right side through the pins 19, 20, 21, 22 and 23.

Using the in-line apparatus control system described above, the performance and reliability of in-line apparatus control can be increased.

A method for recognizing a start and an end of a substrate LOT in the right and left sub-apparatuses will be described.

Figure 6:
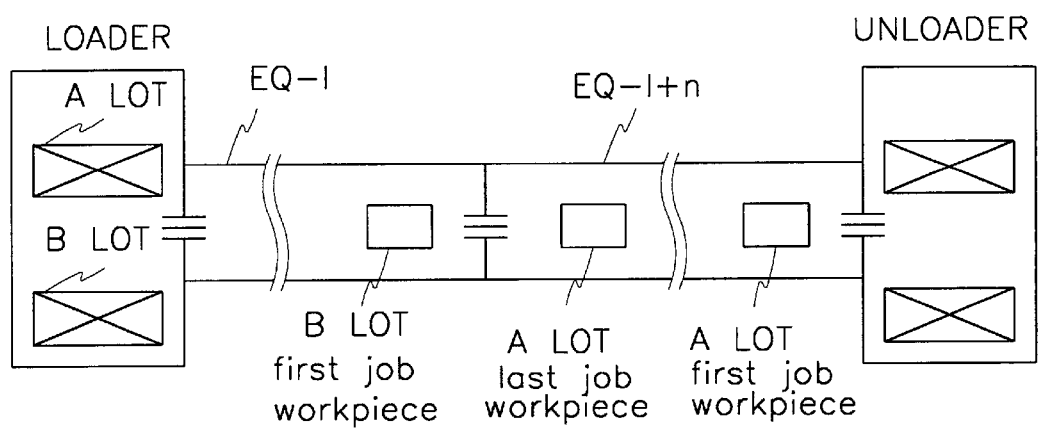
FIG. 6 shows a process to detect a start and an end of a lot in the apparatus according to the preferred embodiment of the present invention.

FIG. 6 shows a process to detect a start and an end of a substrate LOT in the right and left sub-apparatuses.

In the in-line apparatus, a plurality of substrate LOTs are present between the loader and the unloader. Before a job of a previously processed substrate LOT is finished and unloaded, a subsequent substrate LOT is provided to the apparatus. Therefore, if the start and the end of the substrate LOT are not clearly detected, different substrate LOTs can become intermingled.

To solve this problem, referring to FIG. 6, the substrate first inserted from the loader is conveyed to the next sub-apparatus together with a LOT START signal, and the substrate finally supplied from the loader is conveyed to the next apparatus together with a LOT END signal. The LOT START signal and the LOT END signal are conveyed through the PIO. Accordingly, in the preferred embodiment of the present invention, the start and the end of the substrate LOT are distinguished by detecting the LOT START signal and the LOT END signal.

In normal cases where there is a LOT START signal in an I-th apparatus, the starting point of the LOT can be known by the generation of the LOT START signal, and the ending point of the LOT can be known by the generation of the LOT END signal. When there is not a LOT START signal, the starting point of the LOT is recognized as a workpiece next to the last substrate of the previously processed LOT. When there is not a LOT END signal, if a LOT START of a next LOT is provided, the previously processed substrate is recognized as the LOT END. When both the LOT START and the LOT END signals are not present simultaneously, the LOT START and the LOT END are recognized using LOT IDs and cassette IDs. Accordingly, the start and the end of the substrate LOT can be recognized in any case.

The in-line apparatus control system and method according to the present invention easily controls the in-line apparatus and increases reliability of the in-line apparatus.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. An in-line apparatus system, comprising:
    a plurality of sub-apparatuses, each sub-apparatus sequentially performing a predetermined job;

a host storing information on a substrate to be processed in the sub-apparatuses and information on jobs to be performed by the sub-apparatuses;

a plurality of apparatus controllers, each apparatus controller controlling the jobs to be performed on the substrate by the sub-apparatuses according to the information on the substrate and the information on the jobs, and each apparatus controller sharing the information on the substrate through a connection that allows data communications between each apparatus controller; and a master controller, connected to the apparatus controllers to control the apparatus controllers, the master controller receiving information on the jobs processed by the sub-apparatuses from the apparatus controllers and transmitting the information to the host, and transmitting to a corresponding apparatus controller the information on the substrate and the information on the jobs received from the host.

2. The system of claim 1, wherein the master controller and the apparatus controllers are configured with a programmable logic controller.

3. The system of claim 1, wherein the system further comprises an apparatus server connected to the host, the apparatus server receiving information on the jobs processed by the sub-apparatuses from the sub-apparatuses, updating the received information, transmitting the information to the host, receiving information on the jobs processed by the sub-apparatuses from the host, determining whether the jobs of the substrate loaded on the sub-apparatuses can be processed, and transmitting the results of this determination to the sub-apparatuses.

4. The system of claim 1, wherein the system further comprises a handler connected to the master controller and a apparatus server, the handler converting the information transmitted from the apparatus server into a format that can be recognized by the master controller and converting the information transmitted from the master controller into a format that can be recognized by the apparatus server.

5. The system of claim 1, wherein the apparatus controllers share the substrate information transmitted from the host through a link module.

6. The system of claim 5, wherein the substrate information comprises information on a loader on which a job has been started, a cassette, a substrate set, and a type and a grade of the substrate.

7. The system of claim 5, wherein the information on the jobs is transmitted between the sub-apparatuses and comprises information on a receipt status of the substrates on left and right sub-apparatuses, information on the substrates, and information on a start and an end of a substrate set.

8. The system of claim 1, wherein the apparatus controllers receive the information on the jobs processed by a previous sub-apparatus from a previous apparatus controller through a parallel input output device.

9. The system of claim 1, wherein the apparatus controllers are interconnected through cables, and predetermined apparatus controllers are connected to the master controller through cables.

10. The system of claim 9, wherein the predetermined apparatus controllers connected to the master controller through cables are a left-most apparatus controller and a right-most apparatus controller.

11. A method for controlling an in-line apparatus system, the system comprising a plurality of sub-apparatuses each sequentially performing predetermined jobs on a substrate, a plurality of apparatus controllers each controlling substrate jobs of the sub-apparatuses and connected to the sub-apparatuses to enable communications with the sub-apparatuses, and a host storing substrate information and job information to be performed by the sub-apparatuses, comprising the steps of:

(a) transmitting a message to the host through the apparatus controllers, the message indicating that the substrate has been loaded to a first sub-apparatus;

(b) receiving information on the substrate and job information of the first sub-apparatus from the host, and performing a job by the first sub-apparatus;

(c) conveying the substrate to a second sub-apparatus after the job is performed by the first sub-apparatus, and transmitting the information on the substrate processed by the first sub-apparatus from the apparatus controller of the first sub-apparatus to the apparatus controller of the second sub-apparatus; and (d) receiving information on the substrate received from the apparatus controller of the first sub-apparatus and information on the job of the second sub-apparatus received from the host, and controlling a job of the second sub-apparatus.

12. The method of claim 11, wherein the method further comprises a step of repeating the steps (a) through (d).

13. The method of claim 11, wherein the in-line apparatus system further comprises a master controller that receives the information on the substrate and the job information from the host and transmits the information to corresponding apparatus controllers, the apparatus controllers and the master controller sharing the information on the substrate via a communications network.

14. The method of claim 11, wherein the information on the substrate is transmitted through a link module and comprises the information on a loader on which a job has been started, a cassette, a substrate set, and a type and a grade of the substrate.

15. The method of claim 11, wherein the information on the jobs is transmitted through a parallel input output device coupled between the apparatus controllers, the information on the jobs comprising information on a receipt status of the substrates on left and right sub-apparatuses, information on the substrates, and information on a start and an end of the substrate set.

16. The method of claim 11, wherein conveying the substrate to a second sub-apparatus in step (c) comprises the steps of:

checking whether or not a start signal of a substrate set exists in the sub-apparatuses; and checking whether or not an end signal of the substrate set exists in the sub-apparatuses.

17. The method of claim 16, further comprising the steps of:

recognizing a starting point of the substrate set when a starting signal of the substrate set is detected, and transmitting the starting point to a next sub-apparatus through a parallel input output device; and recognizing an end point of the substrate set when an ending signal of the substrate set is detected, and transmitting the ending point to a next sub-apparatus through the parallel input output device.

18. The method of claim 17, further comprising the steps of:

recognizing, when the starting signal of the substrate set is not detected, a substrate next to the last substrate of the substrate set previously processed as a starting point of the substrate set, and transmitting the starting point to the next sub-apparatus through the parallel input output device; and recognizing, when the ending signal of the substrate set is not detected, a substrate previous to the first substrate of the substrate set to be processed as an ending point of the substrate set, and transmitting the ending point to the next sub-apparatus through the parallel input output device.

19. The method of claim 18, wherein the method further comprises the step of detecting the starting point and the ending point using a substrate set ID and a substrate cassette ID when the starting point and the ending point of the substrate set are not present.

* * * * *